(12) United States Patent
Hainsworth et al.

(10) Patent No.: US 10,589,862 B2
(45) Date of Patent: Mar. 17, 2020

(54) ROPE DEPLOYMENT MECHANISM AND METHOD

(71) Applicant: SIKORSKY AIRCRAFT CORPORATION, Stratford, CT (US)

(72) Inventors: Barton J. Hainsworth, Oxford, CT (US); Robert Wislocki, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 348 days.

(21) Appl. No.: 15/502,437

(22) PCT Filed: Sep. 15, 2015

(86) PCT No.: PCT/US2015/050149
§ 371 (c)(1),
(2) Date: Feb. 7, 2017

(87) PCT Pub. No.: WO2016/044248
PCT Pub. Date: Mar. 24, 2016

(65) Prior Publication Data
US 2017/0233075 A1  Aug. 17, 2017

Related U.S. Application Data

(60) Provisional application No. 62/052,749, filed on Sep. 19, 2014.

(51) Int. Cl.
*B64D 1/22* (2006.01)
*B64C 27/06* (2006.01)

(52) U.S. Cl.
CPC ............... *B64D 1/22* (2013.01); *B64C 27/06* (2013.01)

(58) Field of Classification Search
CPC .................. B64D 1/22; B64C 27/06
(Continued)

(56) References Cited

U.S. PATENT DOCUMENTS 2,131,445 A * 9/1938 Lawton ............... B66C 1/38
                                              24/599.9
2,714,731 A * 8/1955 Binmore ............. B63B 23/58
                                              114/378
(Continued)

FOREIGN PATENT DOCUMENTS

| GB | 886655 A | 1/1962 |
|---|---|---|
| GB | 1146891 A | 3/1969 |
| WO | 1999017839 A1 | 4/1999 |

OTHER PUBLICATIONS

International Search Report and Written Opinion; International Application No. PCT/US2015/050149; International Filing Date: Sep. 15, 2015; dated Dec. 10, 2015; 12 Pages.

(Continued)

*Primary Examiner* — Paul T Chin
(74) *Attorney, Agent, or Firm* — Cantor Colburn LLP

(57) ABSTRACT

A rope deployment mechanism includes a load beam pivotable between an open position and a closed position. Also included is a linkage assembly engaged with the load beam in the closed position and moveable to allow the load beam to pivot to the open position. Further included is a locking rod operatively coupled to the linkage assembly. Yet further included is a sliding member translatable between a locked position and an unlocked position, wherein the sliding member is engaged with the locking rod to prevent movement of the locking rod and the linkage assembly in the locked position, and wherein the locking rod and the linkage assembly are moveable in the unlocked position. Also (Continued)

included is a lever configured to actuate movement of the linkage assembly to allow the load beam to move to the open position.

14 Claims, 4 Drawing Sheets

(58) Field of Classification Search
 USPC .................................... 294/82.33; 244/137.2
 See application file for complete search history.

(56) References Cited

U.S. PATENT DOCUMENTS

| | | | | | |
|---|---|---|---|---|---|
| 2,736,599 | A | * | 2/1956 | Coffing | B66C 1/34 |
| | | | | | 294/82.31 |
| 3,109,676 | A | * | 11/1963 | Mercer | B63B 23/58 |
| | | | | | 294/82.27 |
| 3,208,787 | A | | 9/1965 | Cozzoli | |
| 3,504,406 | A | * | 4/1970 | Schott | B64C 25/26 |
| | | | | | 24/603 |
| 3,761,122 | A | | 9/1973 | Epstein | |
| 3,845,978 | A | * | 11/1974 | Huber | B66C 1/34 |
| | | | | | 294/82.3 |
| 3,979,803 | A | * | 9/1976 | Clarke | B64D 17/38 |
| | | | | | 24/494 |
| 5,100,192 | A | * | 3/1992 | McMillan | B63B 21/04 |
| | | | | | 294/82.31 |
| 5,102,176 | A | * | 4/1992 | Duggal | B64D 25/14 |
| | | | | | 24/602 |
| 5,123,374 | A | * | 6/1992 | McMillan | B63B 21/60 |
| | | | | | 114/230.3 |
| 5,158,247 | A | | 10/1992 | Ferrier | |
| 5,901,990 | A | * | 5/1999 | McMillan | B63B 21/04 |
| | | | | | 292/195 |
| 8,016,333 | B2 | * | 9/2011 | Brunner | B66C 1/34 |
| | | | | | 294/82.2 |
| 8,172,184 | B2 | * | 5/2012 | Spencer | B66C 1/36 |
| | | | | | 244/137.1 |
| 8,226,138 | B2 | | 7/2012 | Rocourt | |
| 2013/0328335 | A1 | | 12/2013 | Lewkoski | |

OTHER PUBLICATIONS

Extended European Search Report; European Application No. 15842136.2; dated Jan. 23, 2018; 7 Pages.

* cited by examiner

ROPE DEPLOYMENT MECHANISM AND METHOD

CROSS REFERENCE TO RELATED APPLICATIONS

This application is a National Stage application of PCT/US2015/050149, filed Sep. 15, 2015, which claims the benefit of U.S. Provisional Application No. 62/052,749, filed Sep. 19, 2014, both of which are incorporated by reference in their entirety herein.

BACKGROUND OF THE INVENTION

The embodiments herein generally relate to rope deployment mechanisms, such as those employed to deploy a rope from a rotary wing aircraft, as well as methods of deploying a rope.

Various rotary wing aircraft are equipped to deploy personnel via a rope to locations that the rotary wing aircraft is hovering over. Two main facets of deployment systems for ropes from such aircraft include actuation and safety. In particular, a rope deployment system requires actuation of components configured to deploy the rope, while safety is addressed with separate components that are intended to prevent inadvertent deployment of the rope. Inadvertent deployment of a rope is not only a logistical problem, but a safety hazard if an individual is located on the rope.

Safety features are typically located at regions of the cabin of the aircraft that are not immediately proximate the access opening through which personnel deployment is performed. Safety features have been included along ceilings and side walls of the cabin, but these features often interfere with equipment and operations of the aircraft. Additionally, the safety features reduce space and clearance within the cabin. In such cases, it is possible for personnel to undesirably remove the safety features, thereby reducing the level of safety associated with the rope deployment system.

BRIEF DESCRIPTION OF THE INVENTION

According to one embodiment, a rope deployment mechanism includes a load beam pivotable between an open position and a closed position. Also included is a linkage assembly engaged with the load beam in the closed position and moveable to allow the load beam to pivot to the open position. Further included is a locking rod operatively coupled to the linkage assembly. Yet further included is a sliding member translatable between a locked position and an unlocked position, wherein the sliding member is engaged with the locking rod to prevent movement of the locking rod and the linkage assembly in the locked position, and wherein the locking rod and the linkage assembly are moveable in the unlocked position. Also included is a lever configured to actuate movement of the linkage assembly to allow the load beam to move to the open position.

In addition to one or more of the features described above, or as an alternative, further embodiments may include that the rope deployment mechanism is located proximate an access opening of a rotary wing aircraft.

In addition to one or more of the features described above, or as an alternative, further embodiments may include that the lever comprises a rotatable lever having a torsion return spring biasing the rotatable lever to a position that maintains the linkage assembly in engagement with the load beam when the load beam is in the closed position.

In addition to one or more of the features described above, or as an alternative, further embodiments may include that the linkage assembly comprises a first linkage portion having a lock arm and a second linkage portion, wherein the lock arm retains the load beam in the closed position and the second linkage portion is coupled to the lever and the first linkage portion.

In addition to one or more of the features described above, or as an alternative, further embodiments may include that the second linkage portion comprises a first linkage member and a second linkage member, wherein the first linkage member is coupled to the lever and the second linkage member is coupled to the first linkage member and the first linkage portion.

In addition to one or more of the features described above, or as an alternative, further embodiments may include a main mechanism locking pin configured to be inserted within a hole located adjacent the linkage assembly to prevent movement of the linkage assembly.

In addition to one or more of the features described above, or as an alternative, further embodiments may include that the hole is located adjacent the second linkage portion.

In addition to one or more of the features described above, or as an alternative, further embodiments may include a storage hole for the main mechanism locking pin during operation of the rope deployment mechanism.

In addition to one or more of the features described above, or as an alternative, further embodiments may include that the locking rod is operatively coupled to the first linkage portion.

In addition to one or more of the features described above, or as an alternative, further embodiments may include that the sliding member includes a compression spring.

According to another embodiment, a method of deploying a rope from a rotary wing aircraft is provided. The method includes translating a sliding member to an unlocked position to clear a path of movement for a locking rod operatively coupled to a linkage assembly. The method also includes rotating a lever to actuate movement of the linkage assembly to allow a load beam to pivot to an open position, wherein the rope is deployed in the open position.

In addition to one or more of the features described above, or as an alternative, further embodiments may include that rotating the lever occurs while the sliding member is in the unlocked position.

In addition to one or more of the features described above, or as an alternative, further embodiments may include that rotating the lever displaces a lock arm extending from the linkage assembly, wherein the lock arm retains the load beam in a closed position prior to rotation of the lever and releases the load beam to the open position upon rotation of the lever.

In addition to one or more of the features described above, or as an alternative, further embodiments may include inserting a main mechanism locking pin into a hole located adjacent the linkage assembly to prevent movement of the linkage assembly and to retain the load beam in the closed position.

In addition to one or more of the features described above, or as an alternative, further embodiments may include that deploying the rope is manually performed by a single individual immediately adjacent an access opening of the rotary wing aircraft.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
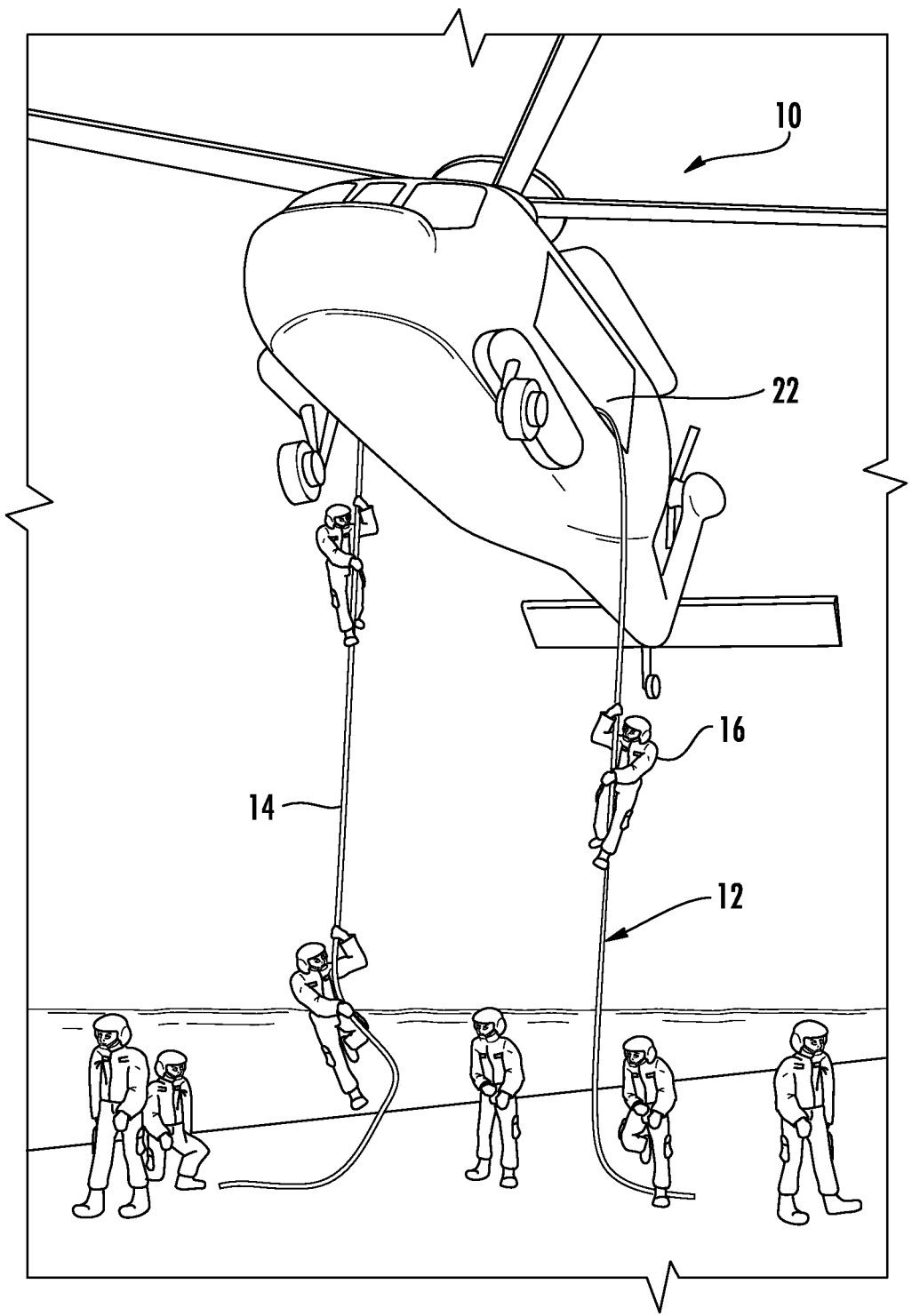
FIG. 1 is a perspective view of a rotary wing aircraft with a rope deployment mechanism.

Referring to FIG. 1, illustrated is a rotary wing aircraft 10 having a rope deployment system 12. Although a particular helicopter configuration is illustrated and described in the disclosed embodiment, other configurations and/or machines that have the ability to hover in a relatively stationary position may also benefit from the embodiments described herein. The rope deployment system 12 facilitates the deployment of a rope 14, cable or the like, from the rotary wing aircraft 10. Upon deployment of the rope 14, personnel 16 may be deployed from the rotary wing aircraft 10. The rope deployment system 12 is beneficial in numerous applications and operations, such as military and rescue operations, for example.

Figure 3:
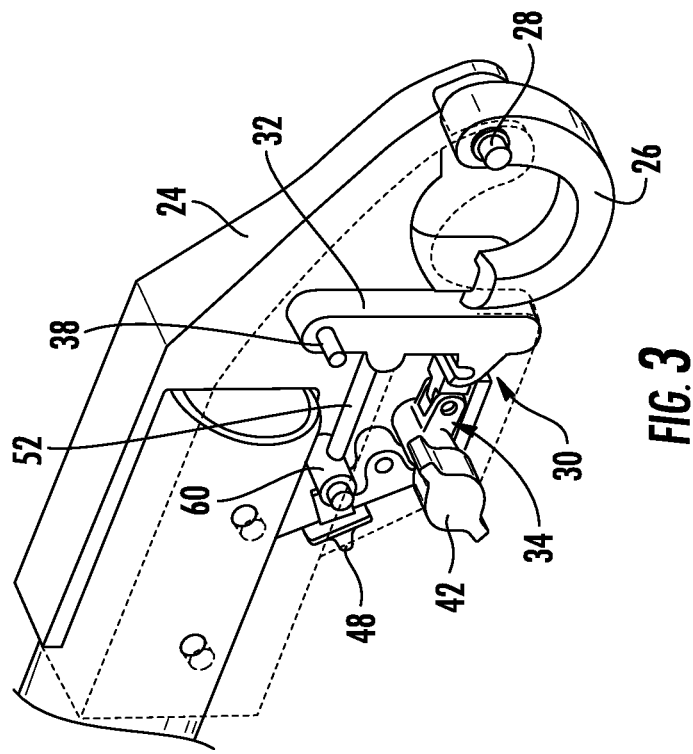
FIG. 3 is a perspective, cut-away view of the rope deployment mechanism.
Figure 2:
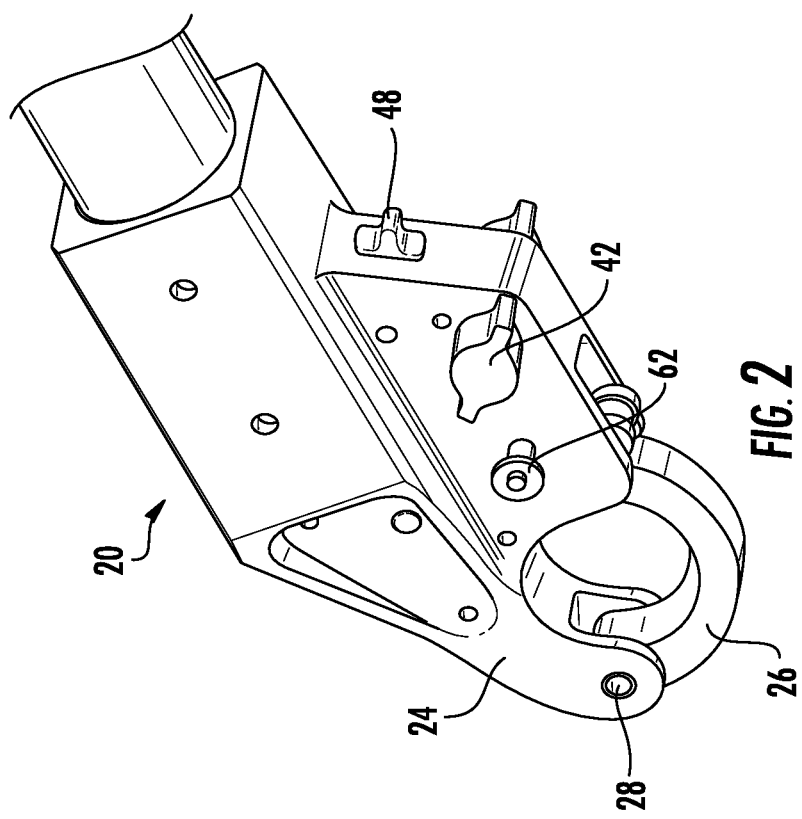
FIG. 2 is a perspective view of the rope deployment mechanism.
Figure 4:
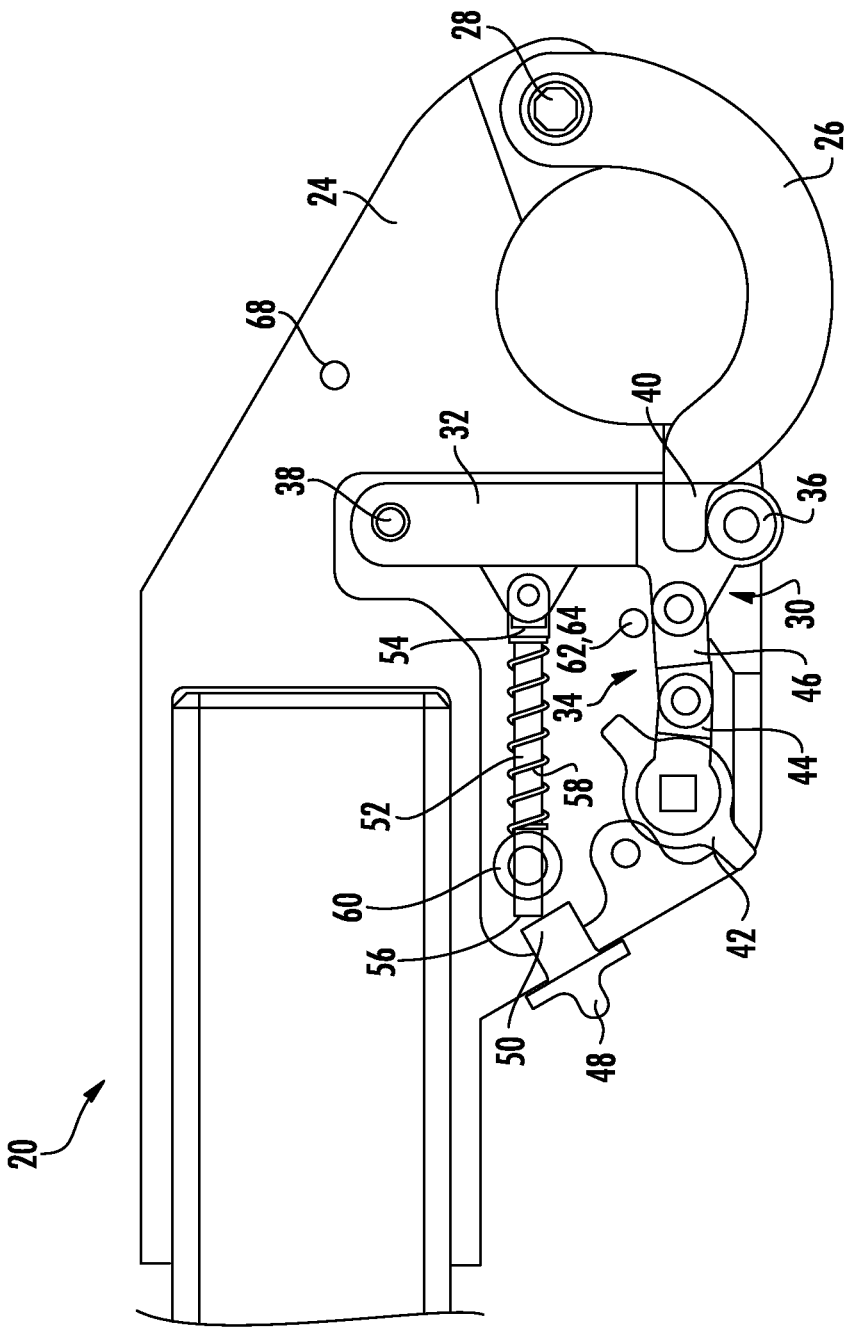
FIG. 4 is a schematic illustration of the rope deployment mechanism in a locked and closed position.

Referring now to FIGS. 2-4, a rope deployment mechanism 20 is illustrated in detail. The rope deployment mechanism 20 is part of the rope deployment system 12 and is configured to safely deploy the rope 14 prior to deployment of the personnel 16. The rope deployment mechanism 20 is located proximate an access opening 22 of the rotary wing aircraft 10 (FIG. 1). This is in contrast to a rope deployment mechanism 20 that is located at central regions of the cabin of the rotary wing aircraft 10. In other words, the embodiments of the rope deployment mechanism 20 disclosed herein are located within close proximity to the access opening 22 or immediately adjacent the access opening 22.

The rope deployment mechanism 20 includes a frame body 24 that is mounted to the rotary wing aircraft 10 proximate the access opening 22. The frame body 24 is a housing for several internal components that will be described herein and is a structure that various components are mounted to. A load beam 26 is pivotally mounted to the frame body 24 with a load beam pivot pin 28 and is moveable between an open position and a closed position. The load beam 26 is illustrated in the closed position, but it can be appreciated that upon pivoting to the open position, the rope 14 that is engaged with the load beam 26, such as in a looped manner, is released and deployed downwardly. To reduce the likelihood of inadvertent or premature deployment of the rope 14 (i.e., moving the load beam 26 to the open position), the rope deployment mechanism 20 provides multiple precautionary layers. Specifically, multiple steps must be taken to actuate movement of the load beam 26 to the open position.

A linkage assembly 30 is housed within the frame body 24 and includes a first linkage portion 32 and a second linkage portion 34. As will be appreciated from the description herein, the linkage assembly 30 retains the load beam 26 in a locked position (i.e., closed position) (FIG. 4) to prevent deployment of the rope 14. Locking of the load beam 26 is achieved with a lock arm 36 that is operatively coupled to, or integrally formed with, the first linkage portion 32. The first linkage portion 32 is pivotally mounted to the frame body 24 with a lock arm pivot pin 38. Although the first linkage portion 32 is illustrated as a single linkage member, it is to be understood that the first linkage portion 32 may comprise multiple linkage members. Irrespective of the number of linkage members that form the first linkage portion 32, the lock arm 36 coupled thereto extends in a direction substantially perpendicular to the first linkage portion 32 and is oriented to retain a lip portion 40 of the load beam 26 in the closed position.

The second linkage portion 34 of the linkage assembly 30 includes at least one, but typically a plurality of linkage members that operatively couple the first linkage portion 32 to a lever 42 configured to control the linkage assembly 30. In some embodiments, the second linkage portion 34 comprises a first linkage member 44 and a second linkage member 46. The first linkage member 44 is operatively coupled to the lever 42 and the second linkage member 46. The second linkage member 46 is operatively coupled to the first linkage member 44 and the first linkage portion 32. Linkage members 44, 46 comprise an over-center linkage for positive locking of the linkage assembly 30 as an additional safety feature.

The dynamically balanced lever 42 is a rotatable member that is externally available (relative to the frame body 24) to a user and rotated to actuate the linkage assembly 30. In the illustrated embodiment, the lever 42 is rotated to manipulate the second linkage portion 34, which then imparts rotation of the first linkage portion 32 to which it is operatively coupled, as described above. Upon rotation of the first linkage portion 32, the lock arm 36 is moved to a location that allows for the release of the load beam 26. In one embodiment, the lever 42 includes a torsion spring configured to bias the lever 42 to a position that maintains the linkage assembly 30 in a position that locates the lock arm 36 in a locking position to retain the load beam 26 in the closed position.

Figure 5:
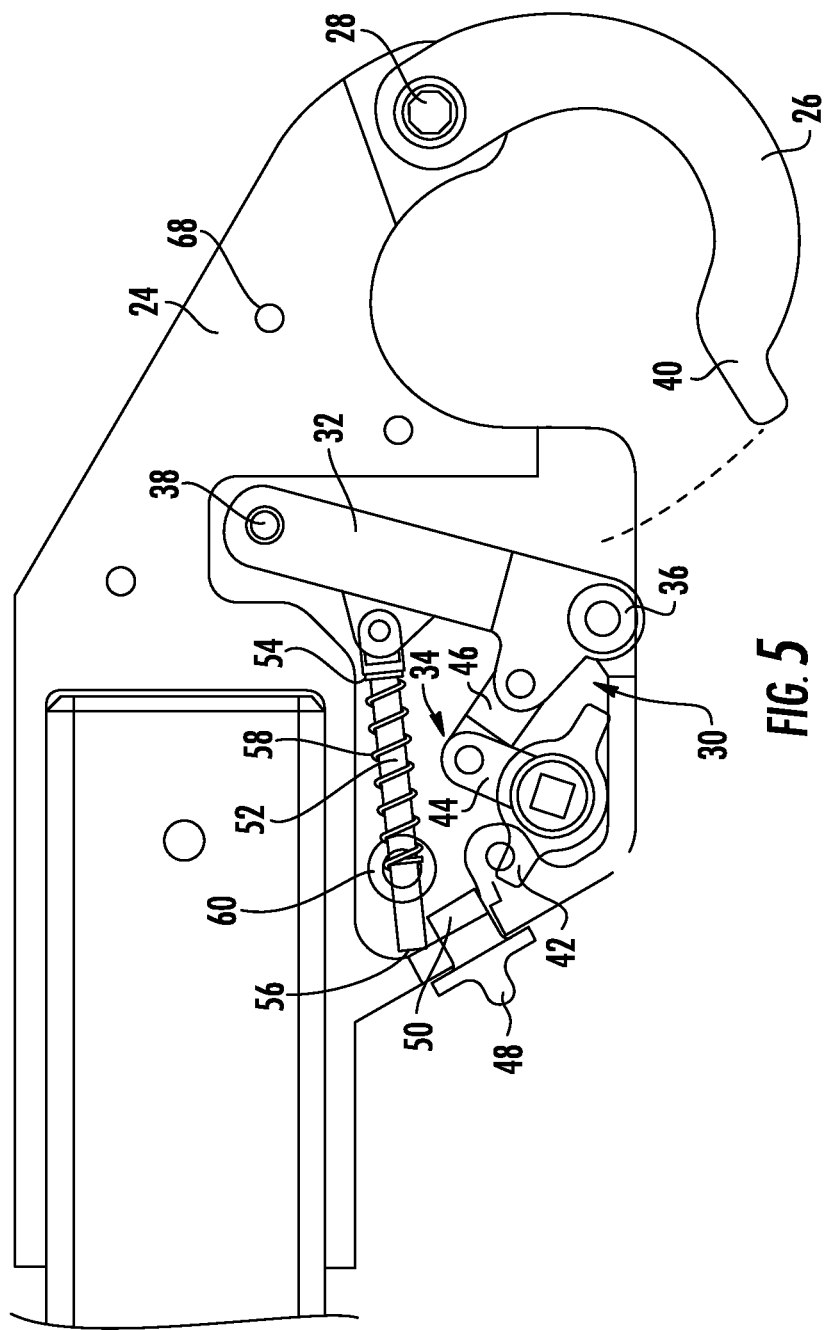
FIG. 5 is a schematic illustration of the rope deployment mechanism in an unlocked and open position.

The lever 42 and linkage assembly 30 facilitate rapid and efficient deployment of the rope 14, however, as noted above, safety concerns related to inadvertent or premature deployment of the rope 14 are addressed with the rope deployment mechanism 20. In particular, movement of the linkage assembly 30, and hence movement of the load beam 26, requires movement of a sliding member 48. The sliding member 48 is partially located external to the frame body 24 to grant access to a user. The sliding member 48 includes a block 50 or other structure that protrudes into an interior region of the frame body 24. The block 50 is translatable between a locked position and an unlocked position. The locked position prevents movement of the linkage assembly 30, while the unlocked position (FIG. 5) allows such movement. A locking rod 52 is operatively coupled to the linkage assembly 30 at a first end 54 of the locking rod 52 and a second end 56 extends into close proximity with, or in contact with, the block 50 of the sliding member 48 when the sliding member 48 is in the locked position. In one embodiment, the first end 54 is operatively coupled to the first linkage portion 32 of the linkage assembly 30. While in the locked position, the block 50 prevents movement of the locking rod 52, thereby preventing movement of the linkage assembly 30. In some embodiments, the locking rod 52 includes a compression spring 58 and a bushing 60 configured to bias the locking rod 52 and to prevent over-rotation of the linkage assembly 30.

In operation, the sliding member 48 is translated to the unlocked position, thereby moving the block 50 out of the movement path of the locking rod 52. By allowing movement of the locking rod 52, the linkage assembly 30 is free to move in a manner that displaces the lock arm 36 to a location that facilitates release of the rope 14 via disengagement with the load beam 26. Actuation of the linkage assembly 30 is made by rotating the lever 42 while the sliding member 48 is in the unlocked position. In this manner, an active unlocking step must be performed prior to rotation of the lever 42. This precautionary measure reduces the likelihood of inadvertent or premature deployment of the rope 14.

An additional layer of protection may be achieved with a main mechanism locking pin 62. Embodiments employing the main mechanism locking pin 62 include a hole 64 located adjacent the linkage assembly 30, such as immediately adjacent the first linkage portion 32 or the second linkage portion 34. Upon insertion of the main mechanism locking pin 62 into the hole 64, rotation of the linkage assembly 30 is prevented. A storage hole 68 may also be provided in a remote location to store the main mechanism locking pin 62. The main mechanism locking pin 62 may be particularly beneficial during training exercises that do not require actual deployment of the rope 14 or during other times when rope deployment is not desirable.

Advantageously, the rope deployment mechanism 20 eliminates control mechanisms for the rope deployment system 12 that are otherwise located within the cabin of the rotary wing aircraft 10, such as along the ceiling and along a side wall of the cabin. The rope deployment mechanism 20 is entirely located within close proximity to the access opening 22 of the rotary wing aircraft 10 and does not interfere with other equipment or operations. As described above, multiple facets of protection are provided against inadvertent or premature deployment of the rope 14, while still maintaining efficient and reliable locking/unlocking and actuation functions that are located within close proximity to each other, such that operation of the rope deployment mechanism 20 may be manually performed by a single individual.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rope deployment mechanism comprising:
   a load beam pivotable between an open position and a closed position;
   a linkage assembly engaged with the load beam in the closed position and moveable to allow the load beam to pivot to the open position, wherein the linkage assembly comprises a first linkage portion having a lock arm and a second linkage portion, and the lock arm retains the load beam in the closed position;
   a locking rod operatively coupled to the linkage assembly;
   a sliding member translatable between a locked position and an unlocked position, wherein the sliding member is engaged with the locking rod to prevent movement of the locking rod and the linkage assembly in the locked position, and wherein the locking rod and the linkage assembly are moveable in the unlocked position; and
   a lever configured to actuate movement of the linkage assembly to allow the load beam to move to the open position, wherein the second linkage portion of the linkage assembly is coupled to the lever and the first linkage portion.

2. The rope deployment mechanism of claim 1, wherein the rope deployment mechanism is located proximate an access opening of a rotary wing aircraft.

3. The rope deployment mechanism of claim 1, wherein the lever comprises a rotatable lever having a torsion return spring biasing the rotatable lever to a position that maintains the linkage assembly in engagement with the load beam when the load beam is in the closed position.

4. The rope deployment mechanism of claim 1, wherein the second linkage portion comprises a first linkage member and a second linkage member, wherein the first linkage member is coupled to the lever and the second linkage member is coupled to the first linkage member and the first linkage portion.

5. The rope deployment mechanism of claim 1, further comprising a main mechanism locking pin configured to be inserted within a hole located adjacent the linkage assembly to prevent movement of the linkage assembly.

6. The rope deployment mechanism of claim 5, wherein the hole is located adjacent the second linkage portion.

7. The rope deployment mechanism of claim 5, further comprising a storage hole for the main mechanism locking pin during operation of the rope deployment mechanism.

8. The rope deployment mechanism of claim 1, wherein the locking rod is operatively coupled to the first linkage portion.

9. The rope deployment mechanism of claim 1, wherein the sliding member includes a compression spring.

10. A method of deploying a rope from a rotary wing aircraft comprising:
    translating a sliding member to an unlocked position to clear a path of movement for a locking rod operatively coupled to a linkage assembly; and
    rotating a lever to actuate movement of the linkage assembly to allow a load beam to pivot to an open position, wherein the rope is deployed in the open position, wherein the linkage assembly comprises a first linkage portion having a lock arm and a second linkage portion, and the lock arm retains the load beam in the closed position prior to rotation of the lever and the second linkage portion is coupled to the lever and the first linkage portion.

11. The method of claim 10, wherein rotating the lever occurs while the sliding member is in the unlocked position.

12. The method of claim 10, wherein rotating the lever displaces the lock arm, wherein the lock arm releases the load beam to the open position upon rotation of the lever.

13. The method of claim 10, further comprising inserting a main mechanism locking pin into a hole located adjacent the linkage assembly to prevent movement of the linkage assembly and to retain the load beam in the closed position.

14. The method of claim 10, wherein deploying the rope is manually performed by a single individual immediately adjacent an access opening of the rotary wing aircraft.

* * * * *